Feb. 6, 1934.    K. E. LYMAN    1,946,086
BRAKE SHAFT SUPPORT
Filed June 29, 1927    3 Sheets-Sheet 2

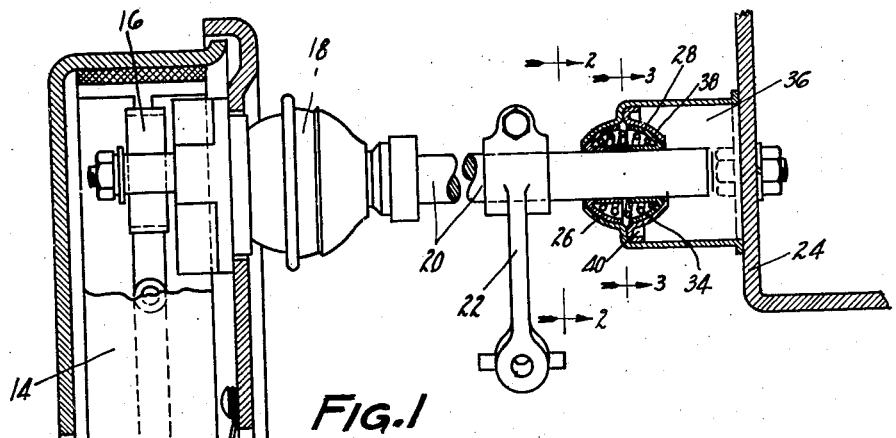
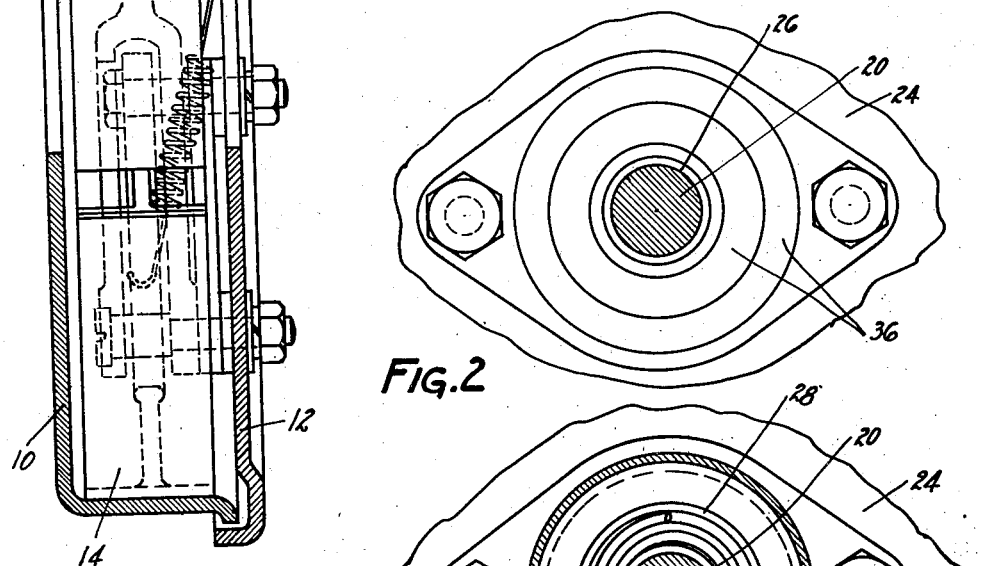
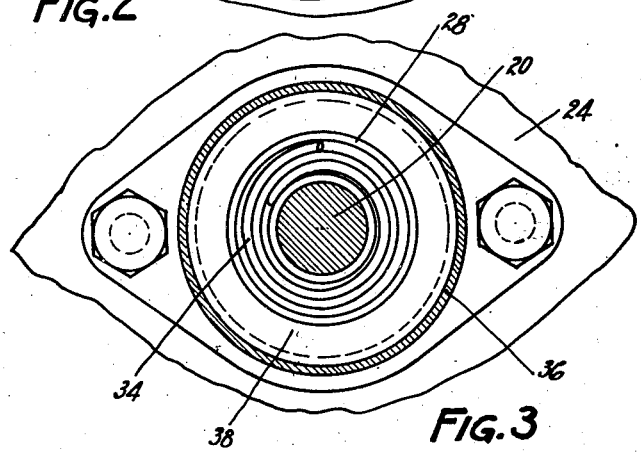
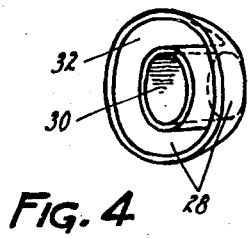

INVENTOR
KENNETH E. LYMAN
BY
ATTORNEY

Feb. 6, 1934.   K. E. LYMAN   1,946,086
BRAKE SHAFT SUPPORT
Filed June 29, 1927   3 Sheets-Sheet 3

INVENTOR
KENNETH E. LYMAN
BY
M. W. McConkey
ATTORNEY

Patented Feb. 6, 1934

1,946,086

UNITED STATES PATENT OFFICE 1,946,086

BRAKE-SHAFT SUPPORT

Kenneth E. Lyman, Chicago, Ill., assignor to Bendix Brake Company, South Bend, Ind., a corporation of Illinois Application June 29, 1927. Serial No. 202,269

3 Claims. (Cl. 308—72)

This invention relates to brakes and the like, and is illustrated as embodied in several supports, each designed for the chassis end of a brake-applying shaft. An object of the invention is to provide a light and inexpensive support which is very strong and which is subject to a minimum of wear, and which will permit the necessary axial movement and universal angular movement of the shaft.

Preferably the support includes a ball, which may be of phenolic condensation material or of die-cast bronze or of drawn brass, thus minimizing the need for lubrication, and which has a novel sectional construction. In the various illustrated arrangements, the sections forming the ball have alined bores slidably receiving the end of the shaft, the plane separating the sections being perpendicular to the shaft, and in the adjacent plane faces of the sections there are spring seats, such as annular sockets surrounding the bores for the shaft and receiving the opposite ends of a coil spring urging the sections apart.

The novel ball support for the shaft is received in a socket formed of two parts, preferably metal stampings, one of which is secured to the chassis and is formed with one half of the socket, while the other is formed with the other half of the socket and is secured in a novel manner to the first.

The above and other objects and features of the invention, including various novel and desirable details of construction, will be apparent from the following description of a number of illustrative embodiments shown in the accompanying drawings, in which:

Figure 1 is a vertical transverse section through the right front brake of an automobile, and through associated parts, looking toward the rear of the car;

Figure 2 is a section on the line 2—2 of Figure 1, showing the novel support in end elevation;

Figure 3 is a section through the support, on the line 3—3 of Figure 1;

Figure 4 is a perspective of one of the sections of the novel ball;

Figure 5:
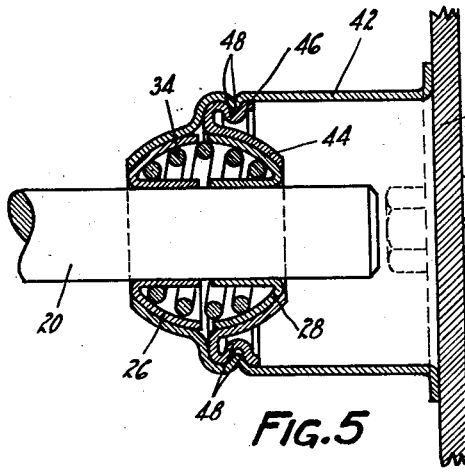
Figures 5 and 6 are sections, each corresponding to part of Figure 1, but through different supports.
Figure 6:
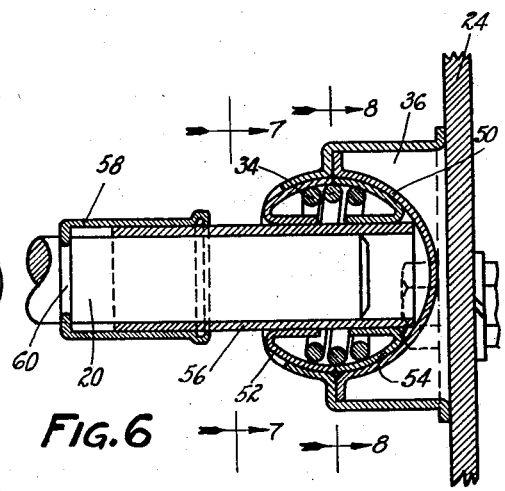
Figure 7:
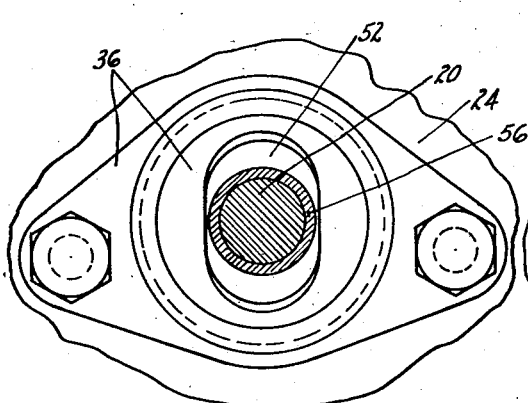
Figure 7 is a section on the line 7—7 of Figure 6, showing the support in end elevation.
Figure 8:
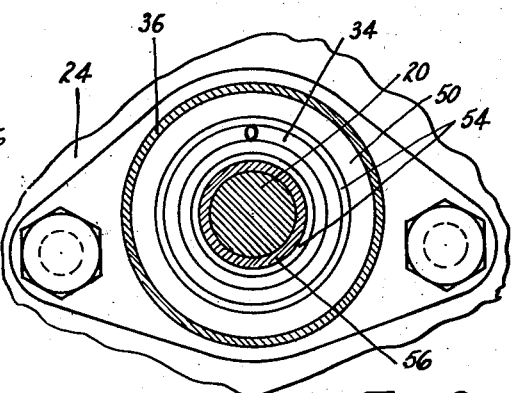
Figure 8 is a section through the support of Figures 6 and 7, on the line 8—8 of Figure 6.
Figure 9:
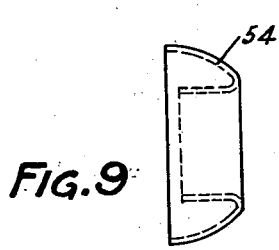
Figure 9 is a side elevation of one section of the novel ball shown in Figure 6.
Figure 10:
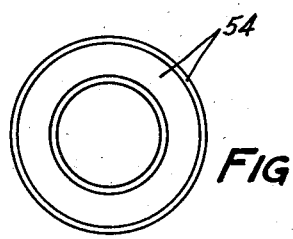
Figure 10 is an elevation of said section, looking from the left toward the right in Figure 9.

The brake shown in Figure 1 includes a drum 10 rotating with one of the front wheels (not shown), at the open side of which is a backing plate 12 secured to the wheel knuckle (not shown), and within which are arranged the shoes or equivalent retarding devices of the brake proper. These shoes are forced against the drum by means such as a cam 16, shown as operated, through a universal joint in a housing 18 at the swivelling axis of the wheel, by a shaft 20 or the like. Shaft 20 is rocked to apply the brake by means such as an arm 22.

The present invention has to do with the novel means for supporting on the chassis part 24 (illustrated as one side frame member) the inner end of shaft 20, in such a manner as to allow the shaft to move axially as well as to have a universal angular movement.

Each of the illustrated supports includes two interchangeable sections (26 and 28 in Figures 1–4) jointly forming a novel ball, the sections having alined central bores 30 slidably receiving the end of shaft 20. Around these bores are formed annular sockets or seats 32, in the adjacent plane faces of the sections, for the opposite ends of a coil spring 34 urging the sections apart. The sections 26 and 28 of Figures 1–4 are best made as stampings drawn from sheet brass or other metal.

The novel sectional ball is mounted in a socket, one half of which (in Figures 1–3) is formed in a stamping 36 forming a bracket bolted to the chassis member 24. The other half of the socket is shown as a stamping 38 having a flange 40 pressed into that part of stamping 36 just beyond the half-socket. Flange 40, in addition to being pressed into place, may if desired also be positively secured to stamping 36 by welding or otherwise.

The support of Figure 5 differs from that just described in that stampings 42 and 44, corresponding to stampings 36 and 38, are positively secured together by making the flange 46 somewhat wider than the flange 40, and rolling an interlocking bead 48 in the flange 46 and that part of stamping 42 which flange 46 underlies. Stamping 44, like stamping 38, is formed with a relatively large central opening for the end of shaft 20.

The support of Figures 6–10 differs from those of Figures 1–5 in that stamping 50, corresponding to stampings 38 and 44, has no central opening for the shaft, and axial movement of the shaft is provided for by arranging the sections 52 and 54 of the novel ball to carry a sleeve 56 slidably receiving the shaft end. The shaft may be provided with a cup-shaped guard 58 snapped into a groove 60 in the shaft, and enclosing the end of sleeve 56. Stampings 52 and 54 may be drawn from sheet brass or the like.

Figure 11:
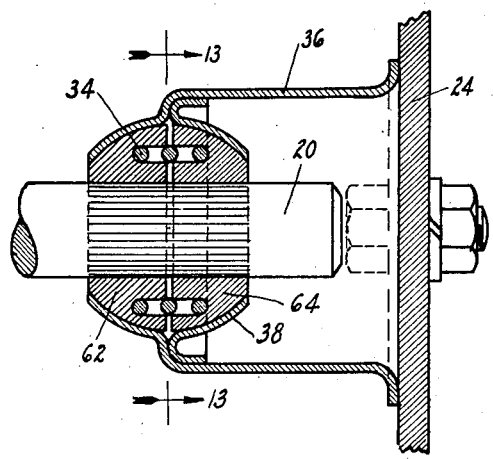
Figures 11 and 12 are sections through different modifications of the support, corresponding to the upper right-hand part of Figure 1.
Figure 12:
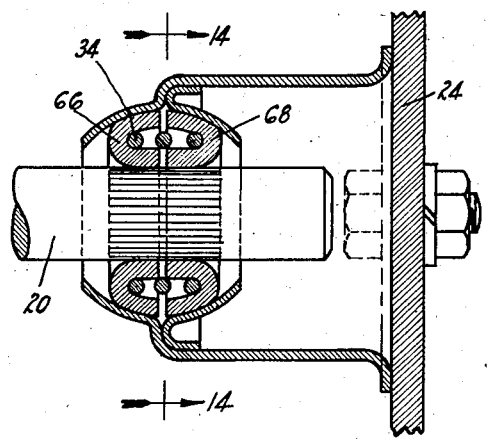
Figure 13:
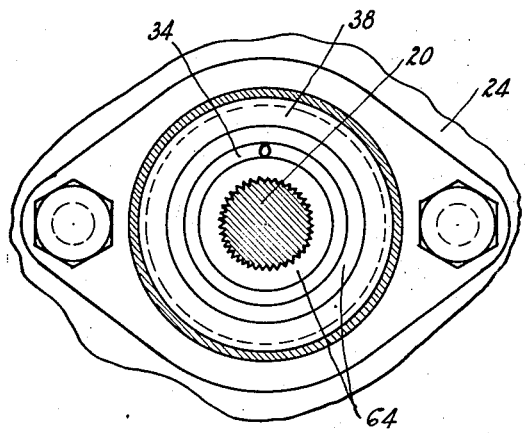
Figure 13 is a section through the joint of Figure 11, on the line 13—13 of Figure 11.
Figure 14:
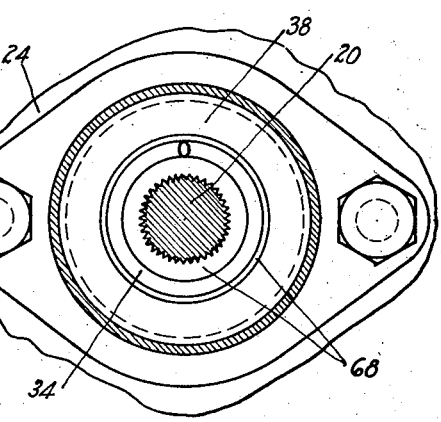
Figure 14 is a section through the joint of Figure 12, on the line 14—14 of Figure 12.

The support shown in Figures 11 and 13 differs from that of Figures 1–4 in that sections 62 and 64, corresponding to sections 36 and 38, are best formed by molding from phenolic condensation material such as bakelite. These sections are also shown splined on the shaft 20, so that they turn with the shaft. The sections 66 and 68 in Figures 12 and 14 are best die-cast from bronze, or a similar alloy requiring no lubrication.

While several illustrated embodiments have been described in detail, it is not my intention to limit the scope of the invention to those particular embodiments, or otherwise than by the terms of the appended claims.

I claim:

1. A support comprising, in combination, a ball including two separate sections formed with alined central bores perpendicular to the plane dividing the sections, and having annular seats surrounding said bores on the adjacent plane faces of said sections, an internally spherical socket receiving said ball, and a coil spring seated in said annular seats at its opposite ends and urging the sections apart against the opposite sides of said socket, said socket consisting of a bracket member formed with one half of the socket, together with a stamping forming the other half of the socket and secured to the bracket member.

2. A socket for a support of the type described comprising, in combination, a stamping formed as a supporting bracket and having integrally drawn therein one half of the socket, and a second stamping forming the other half of the socket and having a flange underlying a part of the first stamping beyond the half-socket, there being a bead rolled in the flange and the part of the first stamping engaged thereby, to secure the two stampings together.

3. A ball forming a part of a universal joint support for a brake applying shaft comprising two separate semispherical hollow shells having aligned central cylindrical sleeves perpendicular to the plane between the shells, having annular spring sockets surrounding said sleeves and formed in the adjacent faces of said shells and each section having its sleeve associated with the corresponding sleeve of the other shell whereby the ball forms a spherical inner member of a universal joint and also a cylindrical bearing for the shaft.

KENNETH E. LYMAN.